(12) United States Patent
Ikeda et al.

(10) Patent No.: US 6,940,019 B2
(45) Date of Patent: Sep. 6, 2005

(54) HORIZONTAL ARRANGEMENT TYPE CABLE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/939,856

(22) Filed: Sep. 13, 2004

(65) Prior Publication Data

US 2005/0103512 A1 May 19, 2005

(30) Foreign Application Priority Data

Nov. 13, 2003 (JP) ........................................ 2003-384150

(51) Int. Cl.[7] .............................. F16L 3/00; F16G 13/16
(52) U.S. Cl. .................... 174/68.3; 174/72 A; 59/78.1; 248/49
(58) Field of Search .............................. 174/68.1, 68.3, 174/69, 72 A, 72 C, 95, 96, 98, 99 E, 100, 101, 105 B, 109; 59/78, 78.1, 82, 95; 138/120; 191/22 R, 23 R; 248/49, 57, 67.7, 200, 206.1, 534

(56) References Cited

U.S. PATENT DOCUMENTS

| | | | | |
|---|---|---|---|---|
| 3,504,864 A | * | 4/1970 | Kurlandsky | 59/78.1 |
| 3,664,619 A | * | 5/1972 | Heidrich et al. | 59/78.1 |
| 4,658,577 A | * | 4/1987 | Klein | 248/49 |
| 5,240,209 A | * | 8/1993 | Kutsch | 59/78.1 |
| 5,638,672 A | * | 6/1997 | Furukawa | 248/49 |
| 6,318,063 B1 | * | 11/2001 | Komiya et al. | 59/78.1 |
| 6,354,070 B1 | * | 3/2002 | Blase | 59/78.1 |
| 6,510,682 B2 | * | 1/2003 | Komiya et al. | 248/49 |
| 6,516,602 B2 | * | 2/2003 | Sakai et al. | 59/78.1 |
| 6,730,850 B2 | * | 5/2004 | Tsutsumi et al. | 174/111 |
| 6,781,058 B1 | * | 8/2004 | DeCicco et al. | 174/72 A |
| 6,787,702 B2 | * | 9/2004 | Suzuki | 174/72 A |

FOREIGN PATENT DOCUMENTS

JP 3157491 2/2001

* cited by examiner

*Primary Examiner*—Anthony Dinkins
*Assistant Examiner*—Adolfo Nino
(74) *Attorney, Agent, or Firm*—Woodling, Krost and Rust

(57) ABSTRACT

To provide a horizontal arrangement type cable protection and guide device, which is bent without distortion between a stationary portion and a movable portion in a horizontal plane under a use environment and can smoothly follow a movement stroke of the movable portion, whereby excellent endurance can be exerted for a long period of time. In a horizontal arrangement type arrangement cable protection and guide device, link plates 12 arranged on a lower side of a large number of connected rectangular link frame bodies 10 are each formed in larger plate thickness than in link plates arranged on a upper side of said link frame bodies 10.

2 Claims, 4 Drawing Sheets

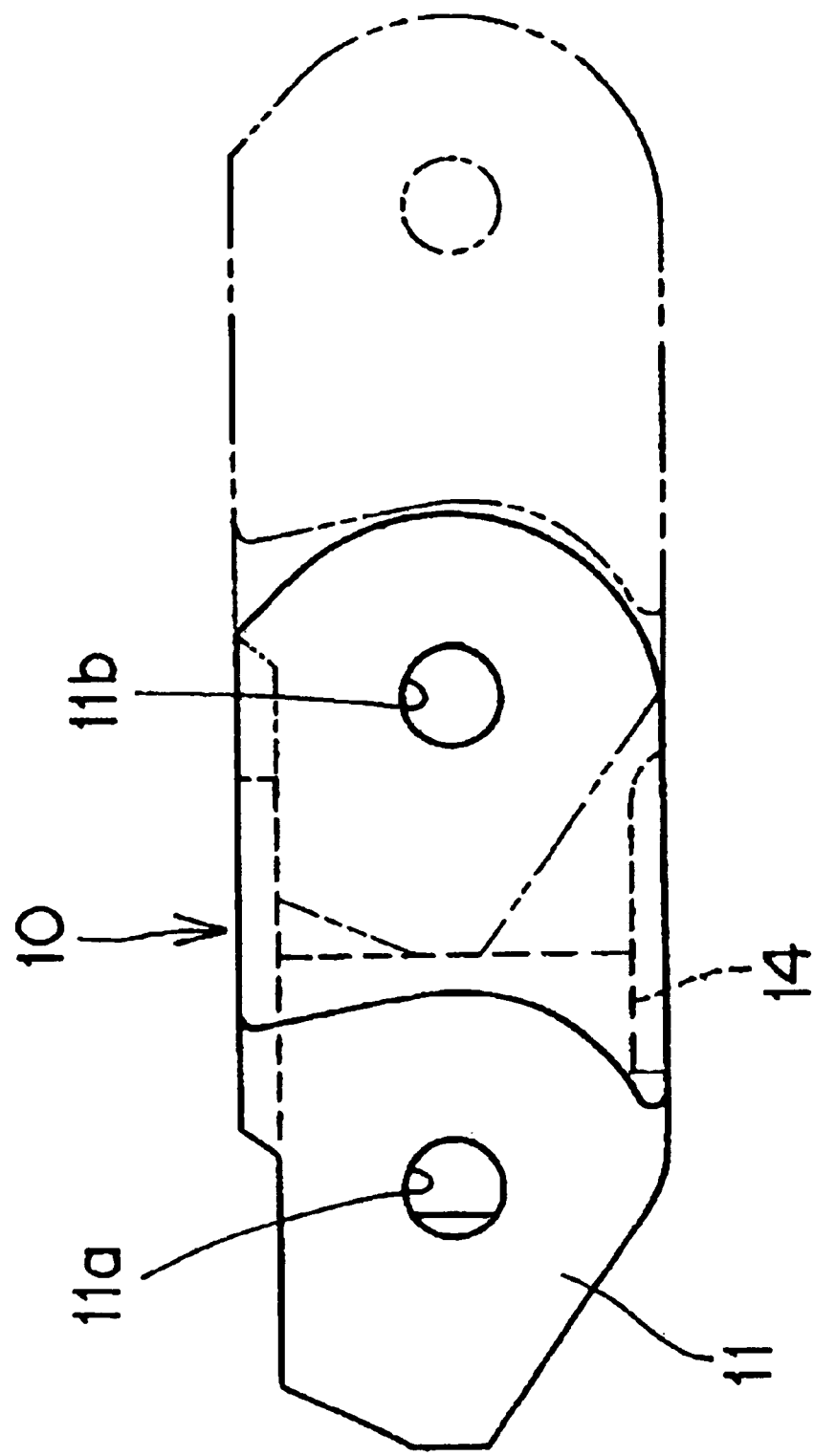

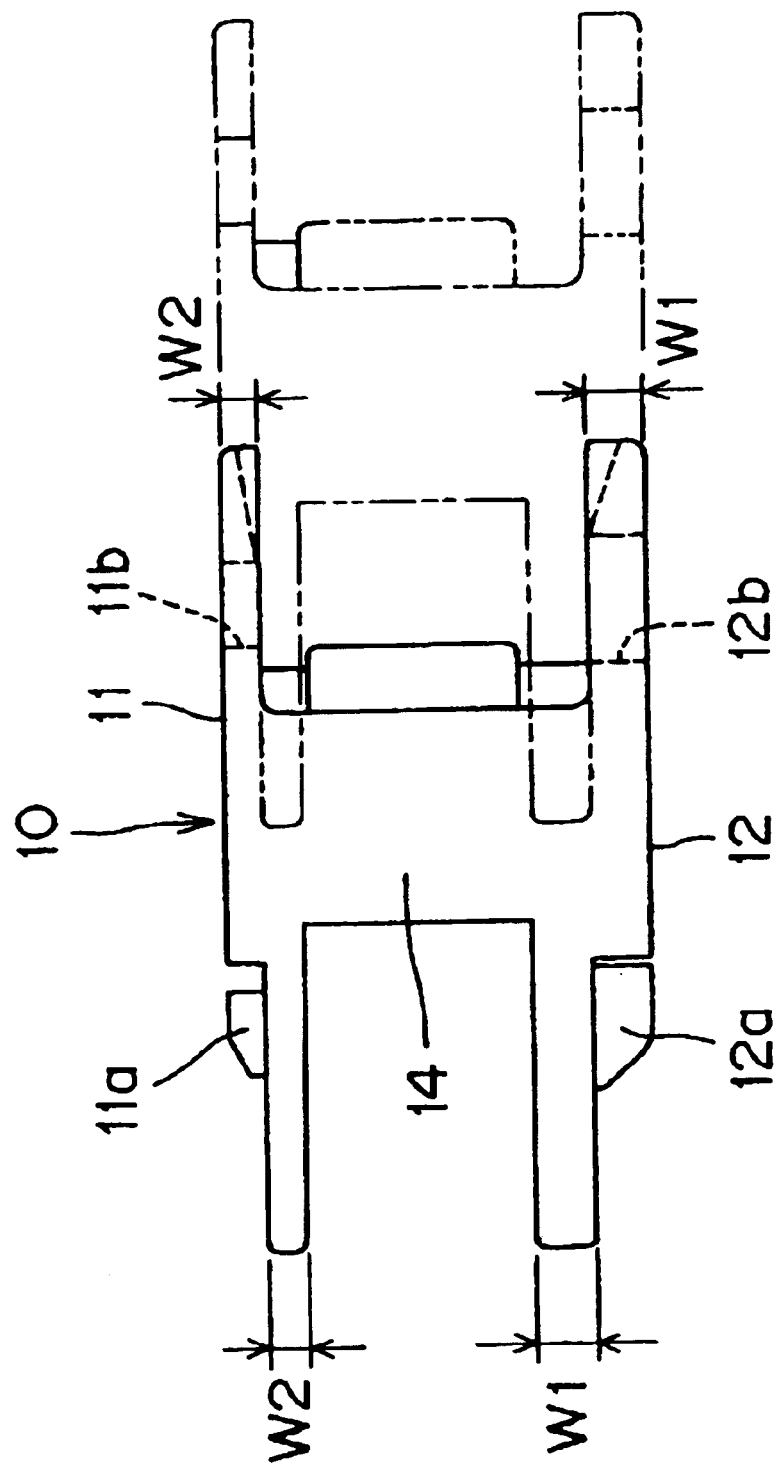

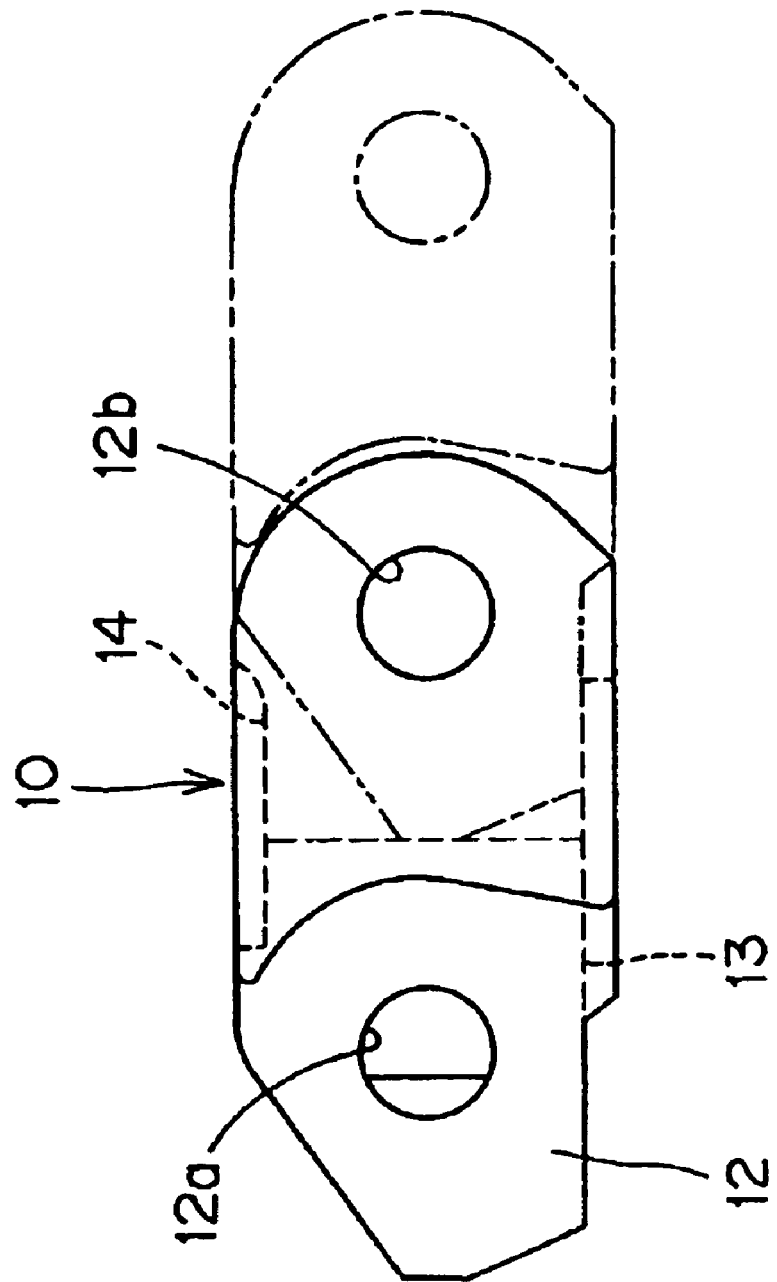

HORIZONTAL ARRANGEMENT TYPE CABLE PROTECTION AND GUIDE DEVICE

This patent application claims priority of Japanese Pat. Appln. 2003-384150 filed Nov. 13, 2003.

TECHNICAL FIELD

The present invention relates to a cable protection and guide device, for securely reliably protecting and guiding a flexible cable or the like, such as an electrical cable, a hydraulic hose, a pneumatic hose, an optical fiber cable or the like, used in industry machines such as a machine tool, an electric device, an industrial robot, a transportation machine or the like, and which electricity feeding, fluid feeding and signaling and the like are performed to the moving machines or movable portions of the machines, and more specifically relates to a horizontal arrangement type cable protection and guide cable, which is articulate or bendable in a horizontal plane under a use environment.

BACKGROUND TECHNOLOGY

Such kinds of cable protection and guide devices include a number of link frame bodies each comprising a pair of spaced link plates, an inner circumferential side connecting plate bridged over a bending inner circumferential side of this link plate and an outer circumferential connecting plate bridged over a bending outer circumferential side of the link plate. These link frame bodies are articulately connected to each other by connecting pins and connecting pin holes formed in the link plate (see for example Patent Reference 1).

This cable protection and guide device is used when a movable portion and a stationary portion in an industrial machine are connected to each other. And one end of a number of connected link frame bodies is connected to a stationary portion through a fixed end jig and the other end thereof is connected to a movable portion through a movable end jig. An electrical cable, which connects the stationary portion and the movable portion, is inserted into the inner space formed continuously formed link frame bodies. On end of the electrical cable is electrically connected to a driving source such as an electric motor, and the other end thereof is electrically connected to an electricity feeding device.

Patent Reference 1: Specification of Japanese Patent No. 3,157,491 (on page 1, FIG. 1).

PROBLEMS TO BE SOLVED BY THE INVENTION

However, in a general use form a conventional cable protection and guide device is articulately arranged in a vertical plane under a use environment. In a case where such a conventional protection and guide device is articulately arranged in a horizontal plane under a use environment, a pair of link plates are each formed in the same plate thickness and connecting pin diameter. Thus, when a supporting member for a large number of connected link frame bodies is not present, distortion is generated in the large number of connected link frame bodies by the weight of the large number of connected link frame bodies themselves and the weight of a cable or the like inserted into the frame link bodies and the like thereby generating trouble in smooth bending motion. Thus there were problems that the conventional cable protection and guide device cannot be applied to a movable portion having a long movement stroke and endurance is remarkably lowered.

Accordingly, the objects of the present invention are to solve the above-mentioned problems and to provide a horizontal arrangement type cable protection and guide device, which is bent without distortion between a stationary portion and a movable portion in a horizontal plane under a use environment and can smoothly follow a movement stroke of the movable portion, whereby excellent endurance can be exerted for a long period of time.

MEANS FOR SOLVING THE PROBLEMS

To attain the above-mentioned objects according to the invention of claim 1, a horizontal arrangement type cable protection and guide device in which a large number of rectangular link frame bodies each comprising a pair of upper and lower spaced link plates, and connecting plates bridged over a horizontal bending inner circumferential side and a horizontal bending outer circumferential side of the pair of link plates respectively are articulately connected to each other by connecting pins and connecting pin holes formed in said link plates and a cable is inserted into a cable accommodating space formed of the continuously formed link frame bodies to guide and protect said cable, is characterized in that the link plate disposed on a lower side in said link frame body is formed in larger plate thickness than in the link plate disposed on a upper side in said frame body.

And according to the invention of claim 2, the above-mentioned objects are attained by the configuration of claim 1 and that the connecting pin and the connecting pin hole of the link plate disposed in a lower side of said link frame body are each formed in a larger diameter than the connecting pin and the connecting pin hole disposed in an upper side of the link frame body.

If a concrete frame body structure of a link frame body used in the horizontal arrangement type cable protection and guide of the present invention is a rectangular frame body structure in which a cable is inserted into a cable accommodating space formed of a large number of articulately connected link frame bodies and can be protected and guided, any structure may be applied to the horizontal arrangement type cable protection and guide of the present invention. For example, even if a pair of upper and lower spaced link plates and connecting plates respectively bridged over a horizontal bending inner circumferential side and a horizontal bending outer circumferential side of the link plates are integrally molded or separately molded, the frame body structure may be used.

EFFECTS OF THE INVENTION

Thus, since a horizontal arrangement type cable protection and guide device of the present invention includes the above-described configurations, the following peculiar effects can be obtained.

Namely, according to the horizontal arrangement type cable protection and guide device, which is the invention of claim 1, the link plate disposed on a lower side in said link frame body is formed in larger plate thickness than in the link plate disposed on a upper side in said frame body. Thus, even if the horizontal arrangement type cable protection and guide device is arranged in a horizontal plane under a use environment the link plate disposed on a lower side of the link frame body acts as a strength member to suppress distortion, which is apt to occur between a stationary portion and a movable portion thereby to maintain smooth bending or articulation. Accordingly, even if there is no supporting member required for a conventional cable protection and guide device and even if a movement stroke of the movable stroke is long, the horizontal arrangement type cable protection and guide device smoothly follows the movable portion so that a cable can be reliably protected and guided in the cable accommodating space formed of continuous link frame bodies, and the endurance of link plates disposed on the lower side of the link frame bodies can be ensured for a long period of time.

Further, since the thicknesses of the upper and lower link plates are different from each other, incorporation error cannot be generated by mixing the upper and lower link plates visually and with feeling during a connection incorporating operation so that a connection incorporating efficiency can be remarkably enhanced.

And according to the horizontal arrangement type cable protection and guide device, which is the invention of claim 2, the connecting pin and the connecting pin hole of the link plate disposed on a lower side of said link frame body are each formed in a larger diameter than the connecting pin and the connecting pin hole disposed on a upper side of the link frame body. Accordingly, in addition to the effects of the invention of claim 1, the distortion in the direction of gravity is suppressed by enlarged parts in diameters in the connecting pins and connecting pin holes disposed on a lower side of the link frame bodies so that a stable rotational bending is attained. Thus, excellent endurance of the connecting pins and the connecting pin holes can be exerted for a long period of time and the connection incorporating efficiency can be enhanced without being influenced by distortion.

BRIEF DESCRIPTION OF THE DRAWINGS

FIG. 2 is a top plan view of a link frame body shown in FIG. 1.

FIG. 3 is a side view of the link frame body shown in FIG. 1.

FIG. 4 is a bottom view of the link frame body shown in FIG. 1.

Figure 1:
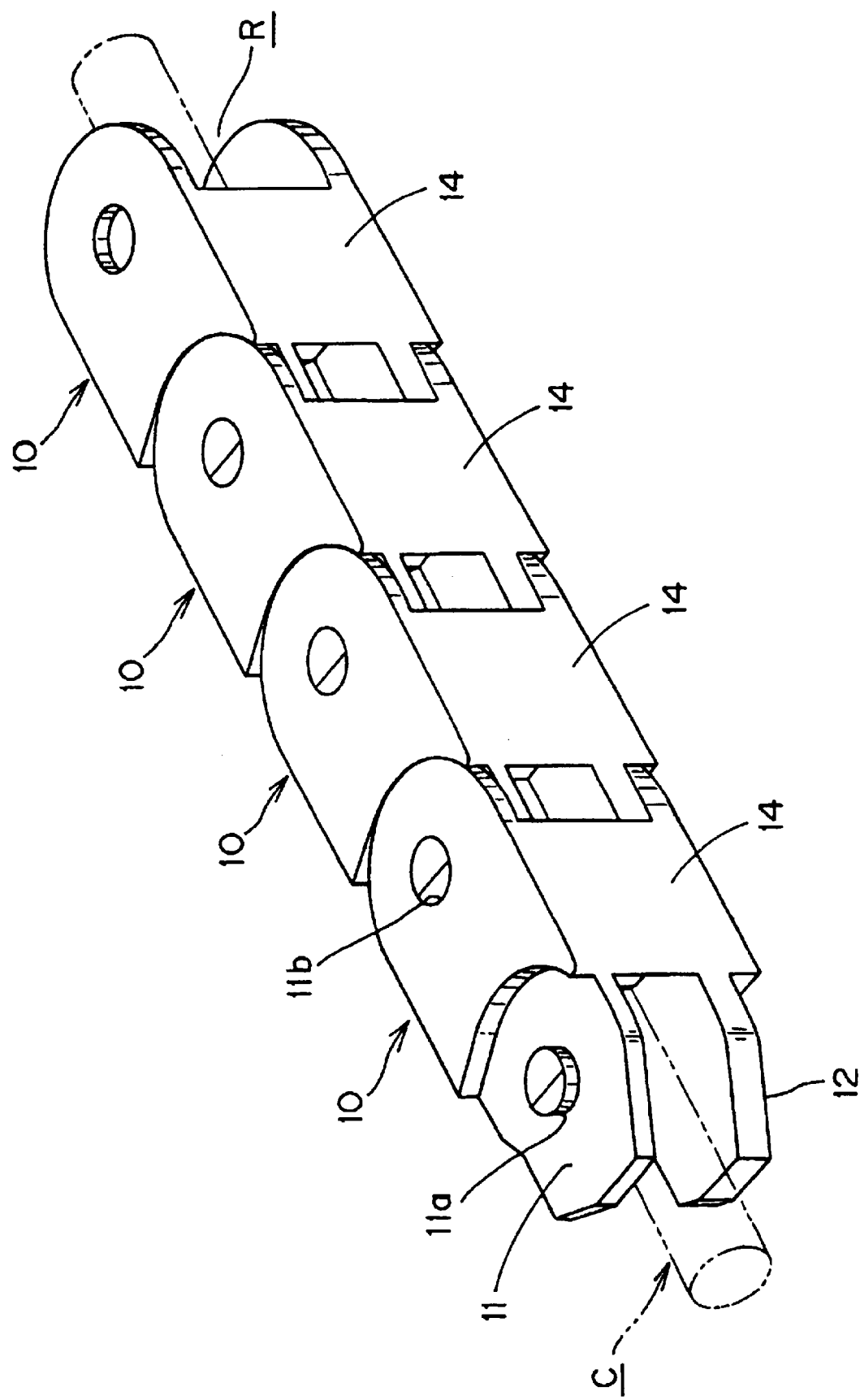
FIG. 1 is a perspective view showing one example of a cable protection and guide device of the present invention.

A better understanding of the invention will be had when reference is made to the Description Of The Invention and Claims which follow hereinbelow.

DESCRIPTION OF THE INVENTION

An example of a horizontal arrangement type cable protection and guide device of the present invention will be described with reference to drawings below. Here FIG. 1 is a perspective view of a horizontal arrangement type cable protection and guide device, which is one example of the present invention, FIG. 2 is a top plan view of a link frame body shown in FIG. 1, FIG. 3 is a side view of a link frame body shown in FIG. 1 and FIG. 4 is a bottom plan view of a link frame view shown in FIG. 1.

EXAMPLE

The horizontal arrangement type cable protection and guide device of the present example is used for protecting and guiding a cable or the like, such as an electric cable, which transmits electric signals or supplies power for connecting a movable portion and a stationary portion of a plasma display, a semiconductor production device or a vehicle and the like, or a hose for supplying hydraulic pressure or pneumatic pressure. Further, in the horizontal arrangement type cable protection and guide device of the present example, a large number of connected rectangular link frame bodies 10 are formed in an elongated shape for connecting the above-mentioned movable portion and stationary portion as shown in FIG. 1, and the horizontal arrangement type cable protection and guide device can exhibit a linear state or a bending state in accordance with movement conditions between the movable portion and the stationary portion. As a result a cable C is inserted into a cable accommodating space R formed of continuous link frame bodies 10 and it can be protected and guided.

The above-mentioned link body 10 is molded using a fiberglass containing synthetic resin (FRP: Fiberglass Reinforced Plastics) such as a fiberglass reinforced polyamide resin, and link plates 11 and 12 arranged in a spaced manner on the upper side and the lower side of a link frame body 10 respectively and connecting plates 13 and 14 respectively bridged over a horizontal bending inner circumferential side and a horizontal outer circumferential side of these link plates 11 and 12 are integrally formed by injection molding in a rectangular shape.

And as shown in FIG. 3, the plate thickness W1 of a link plate 12 disposed on the lower side of the link frame body 10 is formed in larger thickness than the plate thickness W2 of a link plate 11 disposed on the upper side of the link frame body 10. Thus, even if the link frame body 10 is arranged in a horizontal plane under a use environment by forming the link frame body 10 with these link plates 11 and 12, the link plate 12 disposed on the lower side of the link frame body 10 acts as a strength member to suppress distortion, which is apt to occur between a stationary portion and a movable portion thereby to maintain smooth bending or articulation between the link frame bodies 10, 10.

It is noted that the upper link plate 11 and the lower link plate 12 include an offset structure composed of a front side connecting portion and a rear side connecting portion, in which a step is formed in a direction of the plate thickness as shown in FIG. 1.

Further, a connecting pin 12a and a connecting pin hole 12b of the link plate 12 disposed on a lower side of the link frame body 10 are formed in larger diameters than a connecting pin 11a and a connecting pin hole 11b of the link plate 11 disposed on a upper side of the link frame body 10. Thus, a radial load is reduced by enlarged parts in diameters in the connecting pin 12a and connecting pin hole 12b disposed on a lower side of the link frame body 10 so that a stable rotational bending is attained.

It is noted that while the connecting pin holes 11b and 12b have inner diameters by which the connecting pins 11a and 12a are loosely fitted the link frame bodies 10, 10 are smoothly bent each other.

Next, although not shown a further concrete use embodiment in which the horizontal arrangement type cable protection and guide device of the present example is applied will be described while illustrating a case where a cable connected between a car body side stationary portion and a slide type door side movable portion of an automobile. The cable in this case is a feeder cable connecting an electric motor and a power supply for a car body, which operates a slide door.

That is, the horizontal arrangement type cable protection and guide device of the present example is formed in such a manner that a number of link bodies 10 are articulately connected in a horizontal plane between a fixed end jig attached to the car body side stationary portion and a movable end jig attached to the slide type door side movable portion, and a cable C such as a feeder cable or the like is inserted into a cable accommodating space formed of the thus large number of connected link frame bodies 10 to protect and guide the cable C.

Then in the horizontal arrangement type cable protection and guide device of the present example the link plates 12 are disposed at lower portions and are arranged on a car body of an automobile without a supporting member. When a door of the automobile is opened or closed sliding, a link frame body 10 reaches a linear state or a bending state in accordance with its movement stroke and the horizontal arrangement type cable protection and guide device guides the cable C such as a feeder cable or the like while guiding it.

Therefore, the horizontal arrangement type cable protection and guide device of the present example is horizontally arranged without the need of the conventional supporting member. And in a large number of connected link frame bodies 10 the link plate 12 having a larger plate thickness W1 and high mechanical strength is disposed on a lower side. As a result since the lower side link plate 12 receives all loads vertically loaded, the link frame body 10 is not distorted so that it can be held for a long period of time.

Further, the connecting pin 12a and the connecting pin hole 12b disposed on a lower side of the link frame body 10 suppress the distortion in the direction of gravity by further enlarged parts in diameters as compared with the connecting pin 11a and the connecting pin hole 11b disposed on an upper side of the link frame body 10 so that a stable rotational bending is attained. Thus, excellent endurance of the connecting pins 11a, 12a and the connecting pin holes 11b, 12b formed in the link frame body 10 can be exerted for a long period of time and the connection incorporating efficiency can be enhanced without being influenced by distortion.

As described above, in the horizontal arrangement type cable protection and guide device of the present example, the link plate 12 disposed on a lower side in the link frame body 10 is formed in larger thickness than in the link plate 11 disposed on a upper side in the link frame body 10, and the connecting pin 12a and the connecting pin hole 12b of the link plate 12 are each formed in a larger diameter than the connecting pin 11a and the connecting pin hole 11b of the link plate 11. Thus, the horizontal arrangement type cable protection and guide device of the present example is bent without distortion between the stationary portion and the movable portion in a horizontal plane under a use environment so that it can smoothly follow a movement stroke of the movable portion. As a result excellent endurance of the device can be exerted for a long period of time. Thus the effects of the horizontal arrangement type cable protection and guide device of the present example are very large.

DESCRIPTION OF REFERENCE NUMERALS

10 . . . Link frame body
11 . . . Link plate on a upper side
11a . . . Connecting pin of link plate 11
11b . . . Connecting pin hole of link plate 11
12 . . . Link plate on a lower side
12a . . . Connecting pin of link plate 12
12b . . . Connecting pin hole of link plate 12
13 . . . Connecting plate on a horizontal bending inner circumferential side
14 . . . Connecting plate on a horizontal bending outer circumferential side
C . . . Cable
R . . . Cable accommodating space
W1 . . . Plate thickness of link plate 12
W2 . . . Plate thickness of link plate 11

While the invention has been described by way of Example herein those skilled in the art will recognize that changes may be made to the invention without departing from the spirit and scope of the claims as set forth below.

We claim:

1. A horizontal arrangement type cable protection and guide device in which a large number of rectangular link frame bodies each comprising a pair of upper and lower spaced link plates, and connecting plates bridged over a horizontal bending inner circumferential side and a horizontal bending outer circumferential side of the pair of link plates respectively are articulately connected to each other by connecting pins and connecting pin holes formed in said link plates and a cable is inserted into a cable accommodating space formed of the continuously formed link frame bodies to guide and protect said cable, characterized in that:

each of said lower spaced link plates is formed in larger plate thickness than the plate thickness in each of said upper spaced link plates.

2. The horizontal arrangement type cable protection and guide device according to claim 1, characterized in that: said connecting pins and said connecting pin holes disposed in said lower spaced link plates are each formed in a larger diameter than said connecting pins and said connecting pin holes disposed in said upper spaced link plates.

* * * * *